(12) United States Patent
Cromer et al.

(10) Patent No.: US 7,027,843 B2
(45) Date of Patent: Apr. 11, 2006

(54) WIRELESS DEVICE POWER OPTIMIZATION

(75) Inventors: Daryl Carvis Cromer, Apex, NC (US); Philip John Jakes, Durham, NC (US); Howard Jeffrey Locker, Cary, NC (US); James Peter Ward, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 481 days.

(21) Appl. No.: 10/103,110

(22) Filed: Mar. 21, 2002

(65) Prior Publication Data
US 2004/0204181 A1 Oct. 14, 2004

(51) Int. Cl.
 H04M 1/00 (2006.01)
 H04B 1/38 (2006.01)
 H04B 1/04 (2006.01)
 H04B 17/00 (2006.01)
 G08C 17/00 (2006.01)

(52) U.S. Cl. ............... 455/574; 455/67.11; 455/550.1; 455/561; 455/127.5; 370/311

(58) Field of Classification Search ........ 455/572–574, 455/522, 418, 423–425, 557, 561, 550.1, 455/127.1, 127.5, 115.1, 517, 527, 67.11, 455/115.3, 123; 370/310, 311
See application file for complete search history.

(56) References Cited

U.S. PATENT DOCUMENTS

| | | | | |
|---|---|---|---|---|
| 5,241,542 A | | 8/1993 | Natarajan et al. | |
| 5,450,616 A | | 9/1995 | Rom | |
| 5,465,398 A | * | 11/1995 | Flammer | 455/69 |
| 5,956,330 A | | 9/1999 | Kerns | |
| 6,067,297 A | | 5/2000 | Beach | |
| 6,072,784 A | | 6/2000 | Agrawal et al. | |
| 6,272,117 B1 | * | 8/2001 | Choi et al. | 370/330 |
| 6,397,061 B1 | * | 5/2002 | Jordan et al. | 455/421 |
| 6,707,862 B1 | * | 3/2004 | Larsson | 455/69 |
| 6,898,438 B1 | * | 5/2005 | Uchida | 455/522 |
| 2003/0109260 A1 | * | 6/2003 | Fisher | 455/452 |

FOREIGN PATENT DOCUMENTS

| | | | |
|---|---|---|---|
| JP | 08070273 | * | 3/1996 |
| WO | WO 97/23072 | * | 6/1997 |

* cited by examiner

Primary Examiner—William Trost
Assistant Examiner—Meless Zewdu
(74) Attorney, Agent, or Firm—Scott W. Reid; Dillon & Yudell LLP

(57) ABSTRACT

A method and system for conserving battery strength of a mobile node, such as a laptop computer, on a wireless local area network (WLAN). The mobile node transmit symbols, which are units of data, during transmission cycles to maintain a connection with the WLAN. A battery charge level of the mobile node is measured. As the battery charge level drops below pre-defined levels, a frequency of symbol transmission for the mobile node is reduced. The reduction of the frequency of the symbol transmission results in lower power demands by a transmitter chipset of the mobile node. Thus, the mobile node is able to prolong the life of the battery of the mobile node.

14 Claims, 3 Drawing Sheets

WIRELESS DEVICE POWER OPTIMIZATION

BACKGROUND OF THE INVENTION

1. Technical Field

The present invention relates in general to the field of computers, and, in particular, to wireless devices. Still more particularly, the present invention relates to an improved method and system for reducing power consumption of a wireless device in a Local Area Network (LAN).

2. Description of the Related Art

Computer networks have greatly enhanced the computing power available to an individual computer by linking the individual computer to other computers and devices. Not only do networks provide for the exchange of information between autonomous computers, but they also enable each "node" in the network to share resources common to the entire network. Each node may be a computer, a data storage area, an output device such a printer or an interface to another network such as the Internet. Through resource sharing, application programs, databases and physical equipment in the network may be made available to any node without regard to the physical location of the node.

There are generally two types of network interconnections for connecting nodes. The nodes in a wired network communicate among themselves by using transmission lines, either electrical or optical, to carry signals between nodes. The nodes in a wireless network, on the other hand, communicate between nodes using radio frequency signals or other types of wireless communication media.

One type of wireless network is a wireless local area network (WLAN). WLAN's typically use high-frequency radio waves carrying digital data to communicate between nodes. Nodes in the WLAN communicate via transceivers at each node. Each transceiver both transmits and receives radio waves containing digital data. In a WLAN, nodes are typically defined as either base nodes or mobile nodes, in which the base nodes are stationary server computers providing an infrastructure/access point for mobile nodes, and mobile nodes are mobile computers, such as laptop computers, serving as a client device. Wireless communication can be between two stationary base nodes, between a base node and a mobile node, and/or between two mobile nodes. All nodes are within relatively close proximity to one another, such as within a building or an educational campus. The proximity of the nodes permits the network to operate reliably at low power and at high data rates.

Since a WLAN communicates wirelessly, the mobile nodes in the WLAN may be moved about to any location within a broadcast range of the WLAN. The mobile nodes typically are configured around one or more stationary base nodes, which coordinate the activity of the base and mobile nodes in the network. Alternatively, the network can be set up in a free configuration, where the mobile nodes communicate directly with each other without the use of base nodes to control network traffic.

Typically, mobile units wirelessly connected to the WLAN must continuously transmit and receive radio signals during time defined transmission cycles. Each transmission cycle correlates temporally to a multiple of a signal carrier's wavelength. Multiple units of datum may be transmitted during the transmission cycle by modulating either the amplitude or frequency of a carrier radio wave. While a small percentage of the transmission cycles are for communicating robust data from an application program or a website, most of the transmission cycles are used to maintain a communication link between the mobile node and the WLAN, typically between the mobile node and the base node, through the process of "pinging." Pinging is a periodic transmission of an identifier signal between the mobile node and the base node that identifies the mobile node, and confirms to the base node that the mobile node is still wirelessly connected to the WLAN. Each identifier signal typically requires multiple transmission cycles.

To maintain the quality of data communicated across a WLAN, the number of units of data communicated within each transmission cycle is varied depending on the quality of a carrier wave signal. For example, in the Institute of Electrical and Electronics Engineers (IEEE) standard 802.11b for WLAN's, a constant number of symbols are transceived each second, where a symbol is the data transceived during one transmission cycle. The number of symbols transceived per second are either one million symbols per second (1 MSps) or 1.375 MSps, depending on the data transmission rate and how the data is modulated. For example, symbols transmitted at the rate of 1 MSps may be modulated using a technique called Binary Phase Shift Keying (BPSK) which results in one million bits per second (1 Mbps) of data being transceived. Symbols being transmitted at 1 MSps may alternatively be modulated using a more sophisticated modulation technique called Quadrature Phase Shift Keying (QPSK), resulting in 2 Mbps being transceived. Symbols transmitted at the rate of 1.375 MSps may be modulated using QPSK combined with Complementary Code Keying (CCK), which encodes 4 or 8 bits per symbol, resulting in the transceiving of 5.5 Mbps or 11 Mbps respectively.

In all scenarios defined by IEEE standard 802.11b, the nodes transmit and receive symbols at a rate of at least 1 MSps. This results in a high power demand on the nodes, which are continuously transceiving as described above.

Mobile nodes, such as laptop computer/transceiver units, are typically battery powered. While such units may run for several hours if only running a local stand-alone application, transceiving radio signals across the WLAN, such as prescribed by IEEE standard 802.11b, can double the power requirement of the unit, thus reducing the unit's effective battery life by 50%.

When the battery of the mobile node is effectively discharged, the laptop computer can no longer be used for computing or communicating with the WLAN, and important data and/or work may be lost. A spare battery can be carried with the laptop computer, but this adds additional inconvenience, cost and weight to the total unit. In addition, switching out batteries typically requires the laptop computer to be powered down, which is, at a minimum, an inconvenience, and has a potential consequence of causing the mobile node laptop computer to be off-line from the WLAN at a mission critical time. Furthermore, a large percentage of the cost and weight of such a mobile computer is taken up by the battery. Accordingly, to reduce battery weight and increase battery life, it is desirable to keep the mobile node's transceiver power usage and the accompanying battery drain at a minimum.

The constant transceiving of symbols at or above 1 MSps as described above results in the rapid draining of the mobile unit's battery. Thus, there is a need for a method and system that maximizes the battery life of a mobile node in a WLAN while keeping the mobile unit connected to the WLAN.

SUMMARY OF THE INVENTION

The present invention is a method and system for conserving battery strength of a mobile node, such as a laptop computer, on a wireless local area network (WLAN). The mobile node transmit symbols, which are units of data, during transmission cycles to maintain a connection with the WLAN. A battery charge level of the mobile node is measured. As the battery charge level drops below predefined levels, a frequency of symbol transmission for the mobile node is reduced. The reduction of the frequency of the symbol transmission results in lower power demands by a transmitter chipset of the mobile node. Thus, the mobile node is able to prolong the life of the battery of the mobile node.

While reducing the symbol transmission rate may result in longer transmission times to transmit the same amount of information for robust data such as from application programs and website downloads, most transmissions are used to maintain the mobile node's connection to the WLAN by pinging a base node in the WLAN. Pinging the base node less frequently has a minimal impact on maintaining the mobile node's connection to the WLAN, thus overall performance of the mobile node with the WLAN is not significantly affected.

The above, as well as additional objectives, features, and advantages of the present invention will become apparent in the following detailed written description.

BRIEF DESCRIPTION OF THE DRAWINGS

The novel features of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
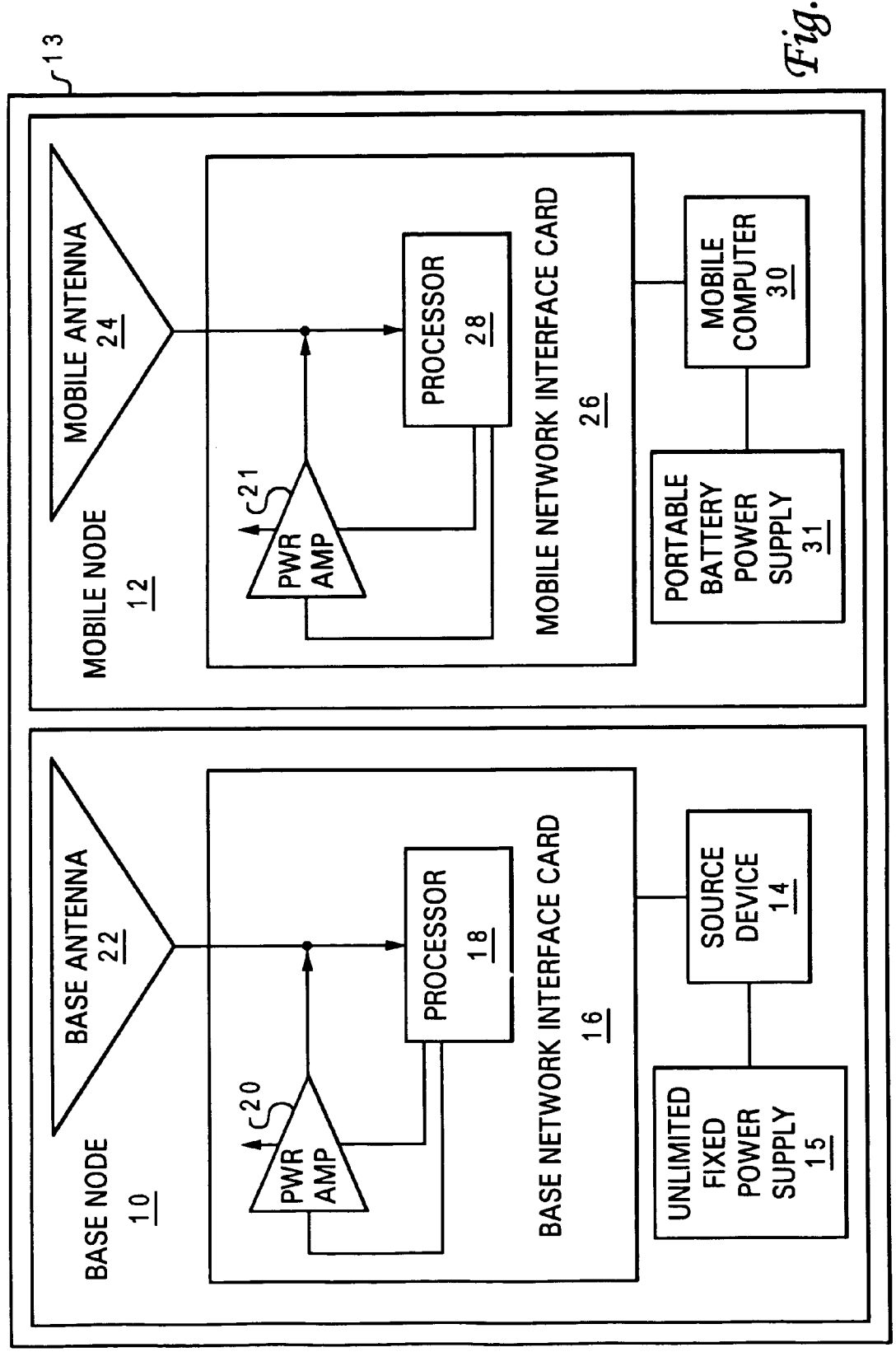
FIG. 1 depicts an exemplary wireless local area network (WLAN) used in the present invention.

With reference now to the drawings, and in particular to FIG. 1, there is depicted a diagram of portions of two exemplary nodes in a wireless local area network (WLAN) 13. For purposes of clarity and simplicity, only a base node 10 and a mobile node 12 are depicted. It is understood that WLAN 13 in a preferred embodiment includes multiple mobile nodes 12, and in an alternate preferred embodiment WLAN 13 also includes multiple base nodes 10.

Base node 10, which is preferably a fixed base node having an unlimited power supply 15, includes a source device 14, which is connected to a base antenna 22 via a base network interface card 16. Source device 14 is typically a data processing device that functions as an interface to a network (not shown), such as an Internet, capable of providing data to be transmitted to mobile node 12 or another base node 10. In a preferred embodiment, base node 10 performs bridging and routing functions between a wired network, such as the Internet, and a wireless network as described for base node 10 and mobile node 12. Data is transmitted and received by base node 10 utilizing base antenna 22 and base network interface card 16. In a preferred embodiment, base network interface card 16 and base antenna 22 are part of a wireless router capable of transmitting and receiving data between source device 14 and multiple mobile nodes 12.

Data from source device 14 is processed by processor 18 for transmission from base antenna 22. This data processing includes data modulation, which is the process of modulating a carrier radio wave to contain the data to be transmitted. Processor 18 preferably uses a frequency-hopping spread spectrum (FHSS) or a direct-sequence spread spectrum (DSSS) signal spreading scheme to improve signal-to-noise performance. In another advantageous embodiment, data modulation performed by processor 18 uses a Binary Phase Shift Keying (BPSK) modulation technique. Alternatively, processor 18 modulates data using a Quadrature Phase Shift Keying (QPSK) modulation technique, with or without Complementary Code Keying (CCK). As is appreciated by those skilled in the art of data transmission, data to be transmitted may be modulated for telemetry transmission using any modulation scheme appropriate as known in the art. Further, the data may be transmitted using medium other than radio waves, including, but not limited to, other wavelengths of electromagnetic radiation useful for telecommunication.

Processor 18 also controls power amplifier 20 through which processor 18 sends and controls data transmission using base antenna 22. That is, processor 18 has the capability of processing the data to be transmitted, preferably by modulation as described above, amplifying the modulated signal using power amplifier 20, and then transmitting the modulated signal as understood by those skilled in the art of telecommunications.

In addition, processor 18 has the ability to demodulate a signal received by base antenna 22. The received signal may be from a mobile node 12 or another base node 10. Base antenna 22 sends the received signal to processor 18, which de-modulates the received signal into a usable data format, preferably digital, and transmits the usable data to source device 30.

Mobile node 12, which preferably operates on a portable battery power supply 31, includes a mobile antenna 24, which transmits and receives radio signals to and from base node 10 or other mobile nodes 12 in a manner described above for base node 10. Mobile node 12 includes a mobile computer 30, which is preferably a laptop computer, personal digital assistant (PDA), or similar portable computing device. Mobile computer 30 connects to mobile network interface card 26, which includes processor 28 and power amplifier 21 for receiving and transmitting data utilizing mobile antenna 24. Mobile network interface card 26 and mobile antenna 24 are preferably components of a plug-in card for mobile computer 30, giving mobile computer 30 wireless access to WLAN 13.

Thus, as described above, base node 10 and mobile node 12 have transceiver capabilities of being able to both transmit and receive wireless data signals to other nodes.

Figure 2:
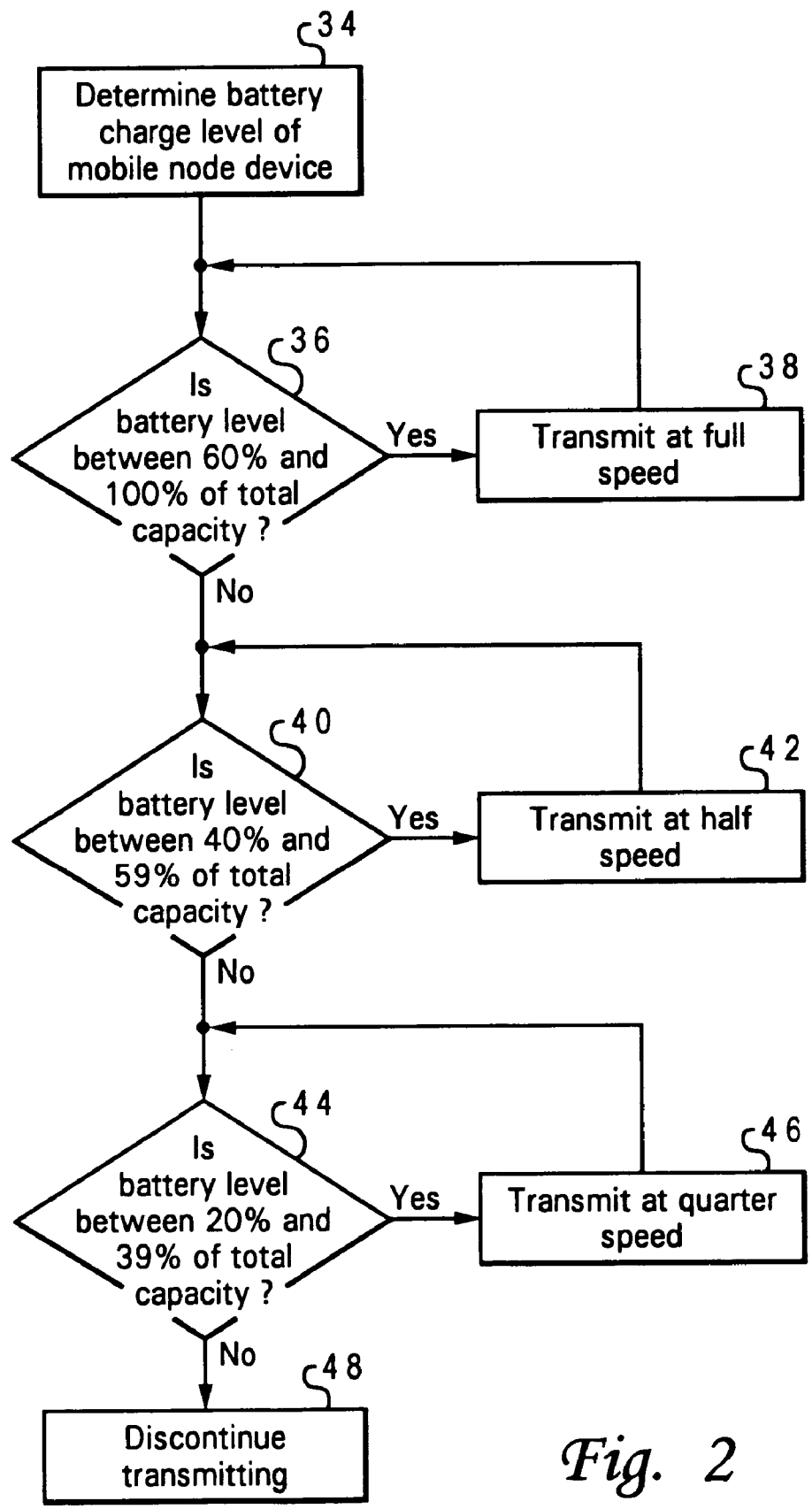
FIG. 2 is a flowchart of the method used by the present invention to maximize a battery life of a WLAN node device.

With reference now to FIG. 2, there is depicted a flowchart of an advantageous method described by the present invention to conserve battery strength of a mobile node in a WLAN. As described in block 34, the battery life, or battery charge level, is measured for the mobile node, which is typically a laptop computer, PDA or similar mobile computing device. A query, as described in block 36, is made to determine if the mobile node's battery charge is above a certain level, shown as an example in block 36 as being above 60% of the total capacity of the battery. If so, the mobile node transmits at full speed, as described in block 38.

Transmitting from the mobile node at full speed refers to a symbol rate of transmission. A symbol is information that is transmitted in a time defined transmission cycle. The symbol is transmitted by either amplitude or frequency modulation of a carrier radio wave during a defined period of time. In a preferred embodiment the number of symbols transmitted or received per second are either one million symbols per second (1 MSps) or 1.375 MSps. The choice of symbol rates depends on how the radio signal is modulated and what data transmission rate is desired. For example, symbols transmitted at the rate of 1 MSps are modulated using a technique called Binary Phase Shift Keying (BPSK) which results in one million bits per second (1 Mbps) of data being transmitted. Symbols being transmitted at 1 MSps may alternatively be modulated using a more sophisticated modulation technique called Quadrature Phase Shift Keying (QPSK), resulting in 2 Mbps being transmitted. Symbols transmitted at the rate of 1.375 MSps may be modulated using QPSK using Complementary Code Keying (CCK), which encodes 4 or 8 bits per symbol, resulting in the transmittal of 5.5 Mbps or 11 Mbps respectively. Other modulation techniques and symbol transmission rates may be used as understood and appreciated by those skilled in the art of data transmission.

Returning to block 38 of FIG. 2, transmitting symbols at full speed means transmitting symbols at a highest rate of transmission allowed by the WLAN, which may be 1 MSps, 2 MSps, 5.5 MSps, 11 MSps or higher. If the battery life of the mobile unit is within a less-than-full charge level, such as between 40% and 59%, the mobile node transceives data at a lower symbol rate, such as a half-speed described in block 42. Thus, if the mobile unit was transmitting symbols at the rate of 11 MSps when fully charged, the mobile unit transmits symbols at 5.5 MSps at half speed. Likewise, as battery life decreases further, symbol transmission rates decrease, as exemplified in blocks 44 and 46, until symbol transmission is discontinued, as described in block 48. While FIG. 2 refers to a "battery" to be understood as a storage device for direct current, a battery may be any electrical storage device having limited capacity.

While symbols have been described and defined as the data contained within a time-defined transmission cycle, that data is often null. That is, while the mobile unit continuously transmits and receives symbols, a large percentage of the symbols contain data having no value. However, the mobile node continues to transceive symbols whether the symbols contain useful data or not. Thus, the mobile node is forced to use valuable battery life transmitting null data. By reducing the transmission rate, it is expected that a longer time period may be required to transmit useful data, either in the form of a robust application program or website data, or in the form of connection "pings" with the WLAN. However, reducing all transmissions according to the remaining battery life of the mobile unit conserves battery power by reducing the number of null data transmissions.

In an advantageous embodiment, the data transmission rate described above is set by the mobile node. Alternatively, the base node may set the data transmission level by detecting the battery life of the mobile node and adjusting the data transmission rate for the mobile node. For example, the base node may receive a battery strength signal from the mobile node, and the base node then sends an instruction to the mobile node adjusting the data transmission rate for the mobile node based on the mobile node's battery strength. The base node also adjusts the rate at which it receives data from other nodes to properly understand the received data.

In a preferred embodiment, data is communicated between nodes, including between a base node and a mobile node, asynchronously. That is, transmissions from a fixed base node to a mobile node may be at a highest frequency permitted by the WLAN, since the power supply of the base node is preferably unlimited, are receiving data at a higher frequency does not require significantly more power than receiving data at a lower frequency. To ensure proper communication protocols are achieved, the transmitting node and the receiving node preferably provide a handshake to each other to determine which transmission rate to use, as depicted in FIG. 3.

Figure 3:
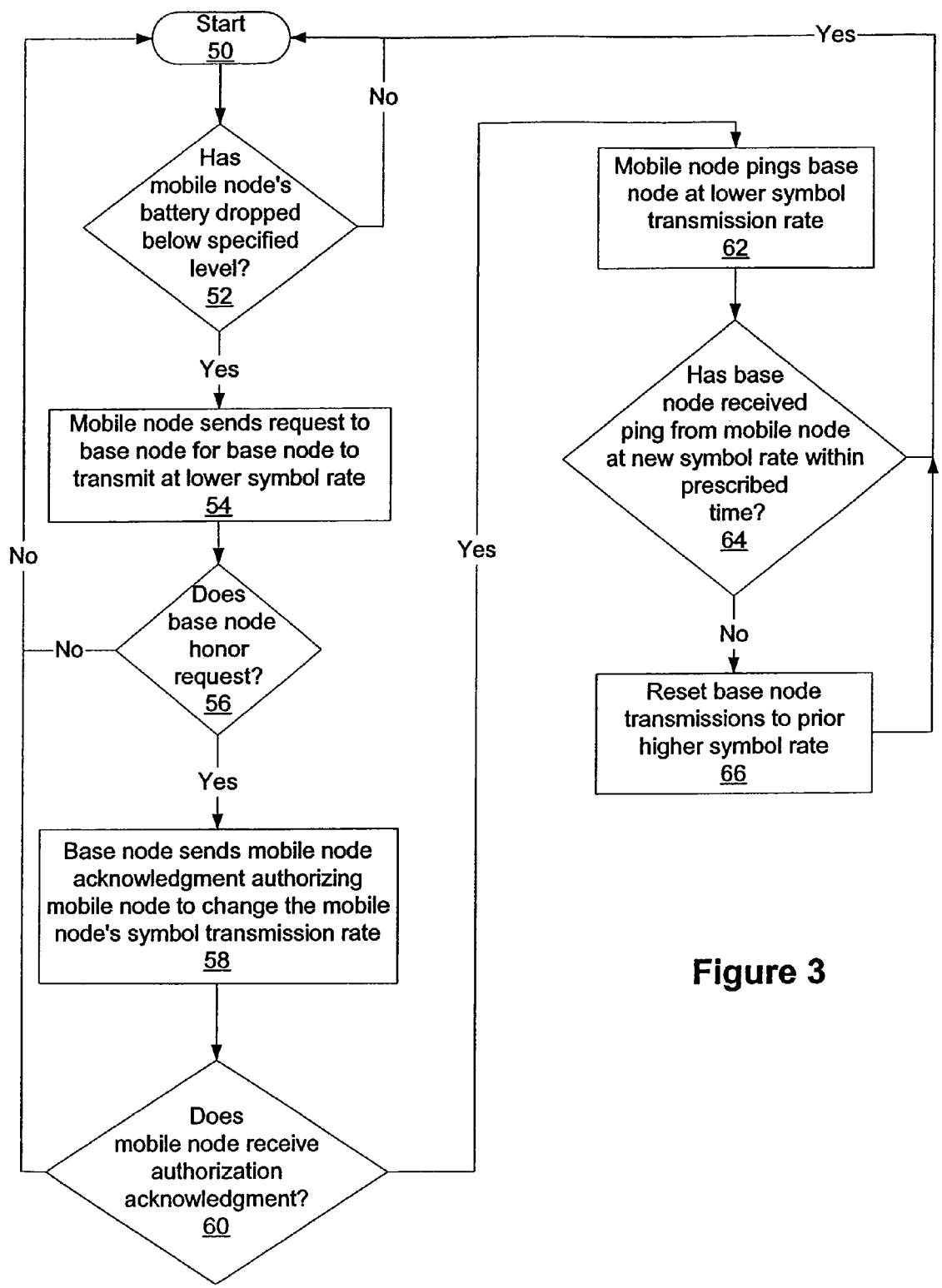
FIG. 3 is a flowchart depicting a handshake between a base node and a mobile node in the WLAN to establish a symbol transmission rate for the mobile node.

With reference now to FIG. 3, when the battery life of the mobile node drops below a specified level, the mobile node sends a request to the base node requesting a lower symbol rate for transmissions from the mobile node to the base node, as described in blocks 50, 52 and 54. The request includes the Internet Protocol (IP) address of the mobile node for identification. If the base node honors the request, the base node sends the mobile node an acknowledgment, authorizing the mobile node to start transmitting at a lower symbol rate, as describe in blocks 56 and 58. In an alternative embodiment, the base node sends a control signal that directly controls the mobile node to begin transmitting at a prescribed lower symbol transmission rate.

If the mobile node receives the authorization from the base node to transmit at the lower symbol rate, it does so by "pinging" the base node at the lower symbol rate, as described in blocks 60 and 62. If the base node does not receive a "ping" from the mobile node within a prescribed length of time, the mobile node resumes pinging and transmitting other data, as described in blocks 64 and 66, at the higher symbol transmission rate previously used by the mobile node.

Note that in the preferred node, transmissions from the base node to the mobile node remain at the highest allowed symbol rate, since the base node typically has a power supply that is essentially unlimited. Likewise, when a fresh battery is installed in the mobile node, the mobile node defaults to the highest symbol transmission rate allowed by the network architecture.

It should be appreciated that the method described above for reducing power consumption in a wireless LAN can be embodied in a computer program product in a variety of forms, and that the present invention applies equally regardless of the particular type of signal bearing media utilized to actually carry out the method described in the invention. Examples of signal bearing media include, without limitation, recordable type media such as floppy disks or compact disk read only memories (CD ROMS) and transmission type media such as analog or digital communication links.

It should further be appreciated that while the present invention is described as adjusting symbol transmission rates, the present invention can similarly be used to adjust any data transmission rate on either a wireless or a wired computer network.

While the invention has been particularly shown and described with reference to a preferred embodiment, it will be understood by those skilled in the art that various changes in form and detail may be made therein without departing from the spirit and scope of the invention.

What is claimed is:

1. A method for transmitting data in a network, said method comprising:
    measuring a battery charge level of a mobile node on the network;
    adjusting an original data transmission rate for said mobile node according to said battery charge level, wherein said original data transmission rate is adjusted downward to a lower data transmission rate when said battery charge level decreases; and
    subsequently transmitting data from said mobile node at said lower data transmission rate, wherein said data is transmitted in a wireless network, and wherein said original data transmission rate is adjusted downward only when said mobile node is pinging a base node, said pinging being a transmission of only sufficient data to maintain a wireless connection between said mobile node and said base node, and wherein if said base node does not receive a ping from said mobile node within a prescribed length of time, then said mobile node resumes pinging said base node at said original data transmission rate.

2. The method of claim 1, wherein data transmitted from a base node to said mobile node remains at said original data transmission rate while data transmitted from said mobile node to said base node is transmitted at said lower data transmission rate.

3. The method of claim 1, wherein said step of adjusting said original data transmission rate downward is performed exclusively by said mobile node.

4. The method of claim 1, wherein said step of adjusting said original transmission data rate downward for said mobile node is performed exclusively by a base node on the network.

5. A mobile node on a computer network having a mobile network interface card that is used to adjust a mobile node data transmission rate for data according to a battery power level of said mobile node, wherein said mobile node data transmission rate is lowered as said battery power level is reduced, wherein said data is transmitted in a wireless network, and wherein an original data transmission rate of said data is adjusted downward only when said mobile node is pinging a base node, said pinging being a transmission of only sufficient data to maintain a wireless connection between said mobile node and said base node, and wherein if said base node does not receive a ping from said mobile node within a prescribed length of time, then said mobile node resumes pinging said base node at said original data transmission rate.

6. The mobile node of claim 5, wherein data transmitted from a base node to said mobile node remains at a higher data transmission rate while data transmitted from said mobile node to said base node is transmitted at said lowered mobile node data transmission rate.

7. The mobile node of claim 6, wherein said network interface of said mobile node is exclusively capable of reducing said mobile data transmission rate as said battery power level is reduced.

8. A base node on a network having a base network interface card that is used to adjust a data reception rate for data according to a battery power level of a mobile node, wherein said data is transmitted in a wireless network, and wherein an original data transmission rate for said data is adjusted downward only when a mobile node is pinging said base node, said pinging being a transmission of only sufficient data to maintain a wireless connection between said mobile node and said base node, and wherein if said base node does not receive a ping from said mobile node within a prescribed length of time, then said mobile node resumes pinging said base node at said original data transmission rate.

9. The base node of claim 8, further comprising means to adjust a data transmission rate of said mobile node according to said battery power level of said mobile node.

10. The base node of claim 8, further comprising:
    a base node network interface, said network interface capable of receiving a data transmitted by said mobile node on said network at a data transmission rate determined by said battery power level of said mobile node.

11. The base node of claim 10, further comprising means for said base node network interface to transmit data to said mobile node on said network at said data transmission rate determined by said battery power level of said mobile node.

12. A computer program product, residing on a computer usable medium, for conserving power consumption in a wireless network, said computer program product comprising:
    program code means for determining a battery charge level of a mobile node on a network;
    program code means for adjusting an original data transmission rate for said mobile node according to said battery charge level, wherein said original data transmission rate is adjusted downward to a lower data transmission rate when said battery charge level decreases; and
    program code means for subsequently transmitting data from said mobile node at said lower data transmission rate, wherein said data is transmitted in a wireless network, and wherein said original data transmission rate is adjusted downward only when said mobile node is pinging a base node, said pinging being a transmission of only sufficient data to maintain a wireless connection between said mobile node and said base node, and wherein if said base node does not receive a ping from said mobile node within a prescribed length of time, then said mobile node resumes pinging said base node at said original data transmission rate.

13. The computer program product of claim 12, wherein data transmitted from a base node to said mobile node remains at said original data transmission rate while data transmitted from said mobile node to said base node is transmitted at said lower data transmission rate.

14. The method of claim 12, further comprising program code means to adjust said transmission data rate downward for transmissions from said mobile node, wherein said downward adjustment is performed exclusive by said mobile node.

* * * * *